United States Patent [19]

Paice et al.

[11] Patent Number: 4,463,400

[45] Date of Patent: Jul. 31, 1984

[54] DC STATIC SWITCH WITH PHASE COMMUTATION

[75] Inventors: Derek A. Paice; Peter Wood, both of Murrysville, Pa.

[73] Assignee: Westinghouse Electric Corp., Pittsburgh, Pa.

[21] Appl. No.: 457,773

[22] Filed: Jan. 13, 1983

[51] Int. Cl.$^{3}$ .............................................. H02H 7/22

[52] U.S. Cl. .......................................... 361/5; 361/9; 361/11; 307/134; 307/135; 363/35; 363/51

[58] Field of Search ......................... 361/10, 6, 7, 9, 2, 361/3, 4, 5, 11; 307/1, 2, 4, 6, 11, 18, 21, 22, 25, 26, 29, 30, 45, 82, 86, 38, 39, 126, 128, 134, 135; 363/51, 35

[56] References Cited

U.S. PATENT DOCUMENTS

| | | | |
|---|---|---|---|
| 3,543,045 | 11/1970 | Hammarlund et al. | 307/82 |
| 3,600,662 | 8/1971 | Anwander | 363/35 |
| 3,651,374 | 3/1972 | Faust | 361/10 |
| 3,670,176 | 6/1972 | Faust | 361/10 |
| 3,714,452 | 1/1973 | Williamson | 307/86 |

*Primary Examiner*—Patrick R. Salce
*Attorney, Agent, or Firm*—John Victor Pezdek

[57] ABSTRACT

An apparatus for the interruption of DC transmission lines without substantial arcing utilizing in combination a DC circuit breaker, a DC-to-AC current converter, converter control and an AC power sink. Upon command from the converter control, DC current is converted to AC current in the current converter and is then magnetically coupled via a transformer into the AC power sink; thus, drawing power out of the DC transmission line and reducing the DC current toward a zero value at which point the DC breaker can be opened without substantial arcing. Various single and multi-phase converter circuits utilizing thyristors are employed. A bypass switch in parallel with the converter can be provided to pass the DC current around the converter during normal operation of the DC transmission line to minimize electrical losses. Alternatively in multi-phase converters, normal DC current can be multiplexed among the phases of the current converter in order to distribute the heating caused by the conduction of DC current therethrough. Interruption of DC transmission lines having bidirectional DC current flow is accomplished with alternate embodiments of the invention including current converters in a back-to-back parallel arrangement, or a current converter full wave bridge rectifier combination or a current converter connected to the DC transmission line via polarity reversing switches.

14 Claims, 8 Drawing Figures

DC STATIC SWITCH WITH PHASE COMMUTATION

BACKGROUND OF THE INVENTION

1. Field of the Invention

This invention relates to devices for the interruption of DC power transmission lines. In particular, the invention provides for switching DC power without substantial arcing using solid state rectifiers such as thyristors in high voltage, high current transmission systems, typically 100 kV DC and 1 kA DC and above.

2. Description of the Prior Art

In high voltage DC (HVDC) transmission systems heavy duty power circuit breakers are used to open circuit or deenergize DC transmission lines. These breakers perform a dual function—opening the line for normal operating conditions such as inspection and maintenance and for correcting fault conditions such as a short circuit. During either condition, when the circuit breaker is opened while current is flowing in the transmission line, an electric arc is generated between the contacts of the breaker as they separate. This electric arc continues conducting current into the transmission line and together with other system parameters causes voltage transients to be generated. The magnitude of these transients can be several times greater than the normal system voltage and can cause extensive damage to equipment connected to the transmission line as well as to the transmission line itself. Therefore, it would be desirous to eliminate or reduce the magnitude of these transients during circuit interruption. Various means have been developed to minimize the magnitude of the arc and the subsequent voltage transients. These means include puffer devices to blow out the arc, use of $SF_6$ insulating gas and stored energy devices to rapidly separate the breaker contacts. However, as the voltage and current ratings of the transmission lines increase, these interruption devices must also be increasingly ruggedized in order to circumvent the arcing and voltage transient problem.

The electric arc which is generated during the opening of a breaker is a complex function of the transmission voltage, current, system inductance and the amount of time required to open the device and extinguish the arc. Present DC breakers have operating times in the range of about 100 milliseconds. In comparing this operating time to a 60 cycle AC system, approximately 6 cycles would be required for the operation of the breaker. By decreasing the operating time for circuit interruption, the magnitude of the transients can be reduced. In addition, if the transmission line current were reduced prior to operation of the circuit breaker, a reduction in the resultant arcing and transients would also occur. Thus, it would be advantageous to have a device which can offer rapid operating times as well as allowing circuit interruption with substantially reduced arcing and transients.

SUMMARY OF THE INVENTION

The interruption of a DC transmission line is accomplished by the combinational use of a DC circuit breaker, a DC-to-AC converter and an AC power sink. When the DC current line needs to be interrupted, such as during a fault condition, the converter is engaged upon command to produce a large inversion voltage across the converter which in turn reduces the DC current in the transmission line to zero. The converter changes the DC current to AC current which is then fed into the AC power sink. As the DC line current approaches zero, the DC circuit breaker can be opened without substantial arcing occurring; thus, interrupting the current in the DC transmission line. The converter is connected in series with the high voltage transmission line and under normal operation the DC current passes therethrough with only minimal losses due to the characteristics of the devices utilized in the construction of the current converter.

In one embodiment of the invention, a three-phase thyristor bridge circuit connected in series with a DC switch and also coupled to a three-phase AC circuit via a transformer is utilized to draw the DC power out of the DC transmission line prior to circuit interruption. In an alternate embodiment of the invention, a bypass switch is provided in parallel with the converter so that during normal operation the DC line current can bypass the converter thus avoiding the voltage and current losses associated with the converter. This bypass switch can be either a mechanical switch or a solid-state switch such as a thyristor. In a further embodiment of the invention and in lieu of the bypass switch, the normal DC line current may be multiplexed among the phases of the bridge circuit used in the converter. This arrangement allows the heating, which occurs as the DC current passes through the converter, to be shared among the phases of the converter bridge circuit.

Because the converter which is used in the apparatus is a forward current device, three additional alternate embodiments are available for the interruption apparatus where the flow of DC current in the transmission line is bidirectional. In one embodiment two converters are connected in series with the DC transmission line and are in a back-to-back parallel fashion with respect to each other. This arrangement provides a forward biased converter for the current flow in either direction with appropriate logic and control signals being used to select the correct converter. A second arrangement for bidirectional current flow utilizes a full-wave bridge rectifier circuit connected in series with the DC transmission line via its AC terminals and with the converter connected to the positive and negative terminals of the bridge rectifier. Here the diode arrangement in the bridge rectifier channels current so that the converter remains forward-biased regardless of the direction of current flow in the DC transmission line. The third arrangement for bidirectional DC current flow utilizes mechanical switches to set the converter to be in the correct sense for the expected normal operating condition.

With the various embodiments for the converter the speed at which the converter acts to draw DC current out of the transmission line prior to the opening of the DC circuit breaker is dependent upon the frequency of the AC power sink system to which it is connected. Where solid-state thyristors are employed in the converter, a full inversion voltage drop can be developed in one-half cycle of the AC power supply, i.e., 8.33 milliseconds for a 60 cycle system, an order of magnitude faster in operation than conventional DC circuit breakers. Use of higher frequency AC power sinks would result in even faster response. In addition, a synchronous machine and flywheel can be incorporated into the AC power sink to help absorb the energy given to the AC power line during interruption operation of the DC transmission line, the synchronous machine and flywheel converting the electrical energy into mechanical energy. DR

DESCRIPTION OF THE PREFERRED EMBODIMENTS

Figure 1:
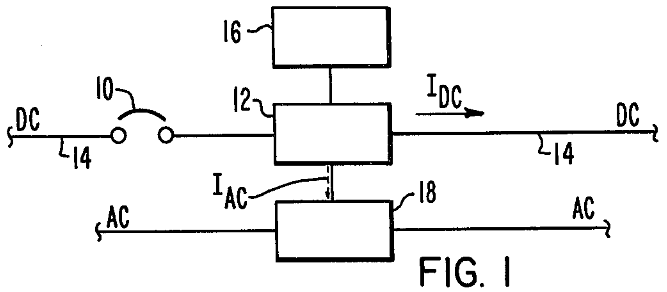
FIG. 1 shows a block diagram of the interruption apparatus embodying the present invention.

In FIG. 1, a generalized block diagram of the invention is illustrated. There, the DC breaker 10 and converter 12 are connected in series with the DC transmission line 14. The converter 12, in turn, is connected to the converter controls 16 and the AC power sink 18. In normal operation DC current, $I_{DC}$, flows in the DC transmission line 14 as indicated by the solid arrow in FIG. 1. When interruption of the DC line 14 is desired, the converter controls 16 enable the converter 12 to change the DC current to AC current, $I_{AC}$, which is then fed into the AC power sink 18 as indicated by the dashed arrow in FIG. 1. As the DC current in the transmission line 14 decreases toward a zero value, the DC breaker 10 can be opened without causing substantial arcing current. After the DC breaker 10 has been opened, the converter 12 is disengaged. Preferably, the converter 12 is located downstream of the DC breaker 10 so that it will also be deenergized when the DC breaker 10 has been opened. However, the converter 12 may be placed ahead of the breaker 10 without affecting the operation of the interruption device. Various circuits used to convert the DC current to AC current are illustrated in FIGS. 2 and 3.

Figure 2A:
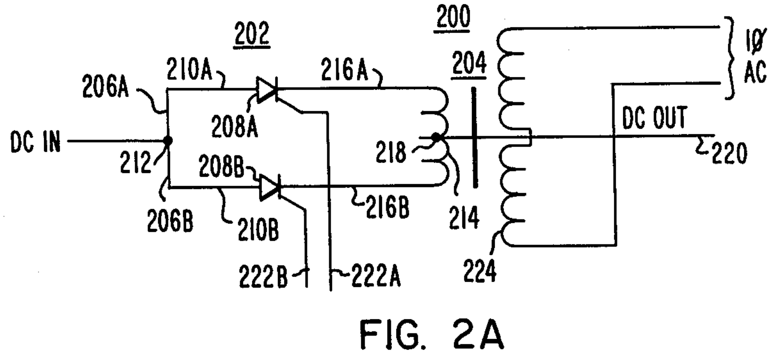
FIGS. 2A and 2B illustrate single-phase converter circuits which can be used with the interruption apparatus of the present invention.
Figure 2B:
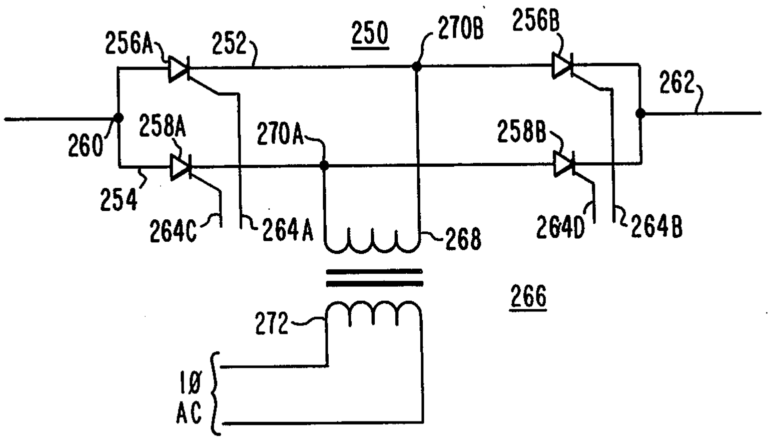

In FIG. 2A and FIG. 2B, converter circuits utilizing a single-phase AC sink are shown. In FIG. 2A, the converter circuit, generally indicated at 200 comprises a single-phase thyristor converter 202 and a transformer 204. The thyristor converter consists of two legs 206A, 206B each having a thyristor 208A, 208B, the anodes 210A, 210B of which are connected in common and serve as the DC current input 212. Each end of the secondary winding 214 of the transformer 204 is connected to a cathode 216A, 216B of one of the thyristors. This secondary winding 214 has a center tap 218 which serves as the DC current output 220. The primary winding 224 of the transformer 204 is connected to a single-phase AC circuit, which serves as a power sink during the interruption process. It should be noted that while the windings of the transformer 204 are referred to as primary and secondary these terms are relative and that this designation of the windings is for convenience and clarity only. The gate 222A, 222B of each thyristor is connected to the control means (not shown). During the interruption operation the converter control alternately turns each thyristor 208A, 208B on and off to create an alternating current, which is then magnetically coupled through the windings of the transformer 204 into the single-phase AC power sink thus drawing DC current and power out of the DC transmission line allowing the DC breaker to be opened without substantial arcing. Because the full DC line current flows in the secondary winding 214 of the transformer, this winding must be rated for full-line current. FIG. 2B illustrates a converter circuit where conduction of the DC line current through the windings of the transformer is avoided under normal operating conditions.

In FIG. 2B, a four-thyrsitor converter circuit is illustrated. The converter circuit 250 utilizes two parallel legs 252, 254 each leg comprising two thyristors 256A, 256B and 258A, 258B connected in series. The cathode of the first thyristor 256A, 258A in each leg is connected to the anode of the second thyristor 256A, 258B in each leg. The anode of the first thyristor 256A, 258A in each leg is electrically connected in common and forms the DC input 260. Similarly, the cathodes of the last thyristor 256B, 258B in each leg are connected in common and form the DC current output 262. The gate 264A, 264B, 264C, 264D of each thyristor 256A, 256B, 258A, 258B is connected to the converter control (not shown). Connections 270A and 270B for the secondary winding 268 of a transformer 266 are provided across the two legs 252, 254 of the converter circuit intermediate each pair of thyristors. The primary winding 272 of the transformer 266 is connected to a single-phase AC system which acts to sink the power taken from the DC transmission line. In operation, the first thyristor in one leg and the second thyristor in the other leg are simultaneously operated to produce the AC current from the DC current. For example, for the circuit illustrated in FIG. 2B, the current path on the first half cycle of operation would be through thyristor 256A and 256B with thyristors 258A and 258B being turned off. Just before the AC supply voltage reverses thyristor 258A would be gated such that thyristor 256A is turned off. As soon as the voltage is reversed thyristor 258B starts to conduct and turns off thyristor 256B. In this second half of the operating cycle thyristors 258A and 258B would be conducting with thyristors 256A and 256B being turned off.

Figure 3:
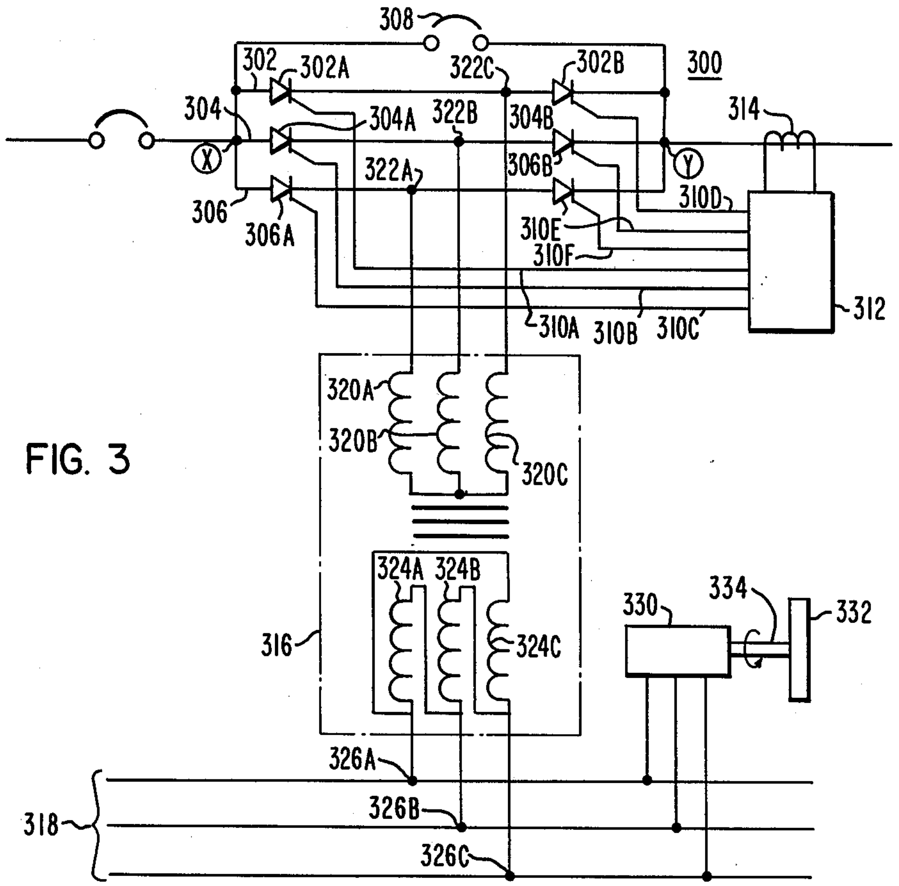
FIG. 3 is an alternate embodiment of the invention illustrating a three-phase converter and an AC power sink with a synchronous machine and flywheel.

A current interruption apparatus employing a three-phase converter circuit with a current bypass is illustrated in FIG. 3. Here the converter circuit 300, which is used for the three-phase operation, is substantially similar to that shown in FIG. 2B with three legs, 302, 304, 306 one leg for each phase with each leg having two thyristors 302A, 302B, 304A, 304B, 306A, and 306B. In addition to the converter 300, a bypass switch 308 is connected in parallel with the converter circuit 300. In normal operation, this bypass switch 308 is closed diverting the normal DC current around the converter circuit 300. When interruption of the DC circuit is desired, this bypass switch 308 is opened causing the DC current to flow through the converter circuit 300. Again, the gates 310A–F of each thyristor in the circuit are connected to the converter control 312. Also shown connected to the control is a current transformer 314 which can be used to sense an overcurrent condition in the DC transmission line. The current transformer 314 generates a signal which causes the current converter control 312 to initiate the interruption process. Other devices such as a push button switch or protective relaying may be used to generate the control signal which initiates the interruption process. A transformer 316 which is used to interconnect the converter circuit 300 with a three-phase AC transmission line 318 has wye-connected secondary windings 320A–C with the free-ends thereof having connections 322A–C to the converter circuit 300 with the delta-connected primary windings 324A–C having connections 326A–C to the phases of the AC line 318. Although the secondary and primary windings of the transformer 316 are shown as wye and delta connections, respectively, other combinations such as a wye-wye or delta-delta or delta-wye connection for the secondary and primary windings are possible.

During interruption of the DC transmission line, one switching scheme for the converter circuit 300 would by thyristors 302A and 304B, 304A and 306B, and 306A and 302B. This switching scheme produces an AC current which is magnetically coupled to the three-phase AC line 318 via the transformer 316. Other switching schemes for the thyristors are possible. Incorporation of the bypass switch 308 in the converter circuit 300 allows the thyristors which are used during the interruption process to be rated for only momentary electrical operation. This, in turn, decreases the size and cost as well as the electrical losses associated with these devices. Where the bypass switch is not used, the converter control 312 can be programmed to multiplex the normal DC current through each leg of the converter circuit 300, that is, the current is conducted on a cyclic time-sharing basis through the first leg 302 of the converter without commutation, then the second leg 304, then the third leg 306. This operating sequence is referred to as the cyclic freewheeling mode and allows the heat which is generated by the operation of the devices to be shared among all the devices in the circuit. When cyclic freewheeling is employed, small commutating currents are generated in the secondary windings 320A–C of the transformer 316, these commutating currents being negligible in comparison to the normal DC current conducted in the DC transmission line.

In FIG. 3, a further embodiment of the invention utilizing a synchronous machine 330 and flywheel 332 is shown. Because a power surge occurs on the AC line 318 when the interruption process occurs, the synchronous machine 330 can be provided to absorb this additional energy input. The synchronous machine 330 acts to convert this additional electrical energy into mechanical energy which is stored in the flywheel 332 attached to the output shaft 334 of the synchronous machine.

Although the converter circuit 300 illustrated in FIG. 3 utilizes three phases or legs, any number of phases for the converter can be provided with appropriate modification of the converter control to accept the increased number of phases. In addition, more than two thyristors can be provided in each phase or leg of the converter circuit. The number of thyristors is dependent upon the voltage support characteristics of the thyristor device. For example, if the DC system voltage were 1500 volts DC and the maximum voltage the thyristor could support was 500 volts, then a total of three thyristors connected in series would be necessary for each of the thyristors shown in the converter circuit 300. Implementing this example with the converter 300 the leg 302 having thyristors 302A and 302B would be comprised of six thyristors connected in series. Because of the characteristics of the converter circuit an even number of thyristors is provided in each phase or leg thereof.

Figure 4:
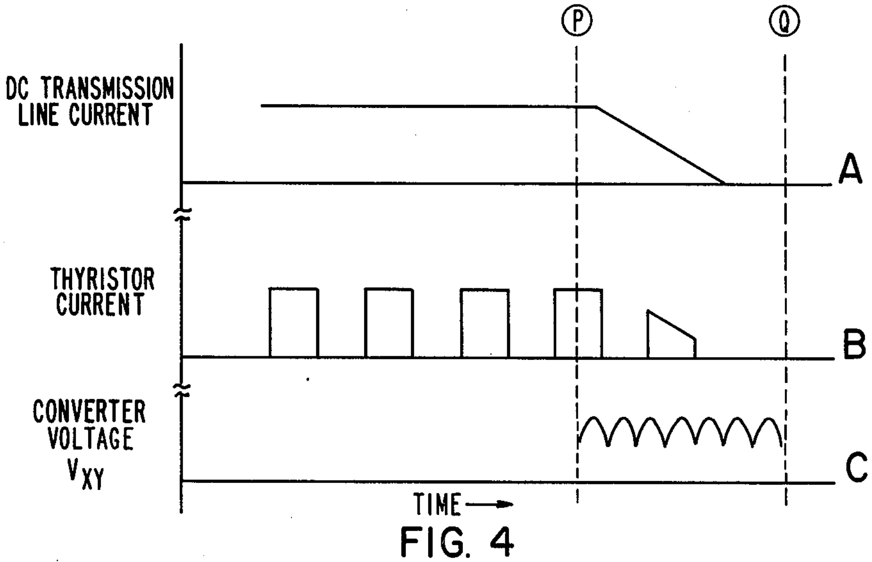
FIGS. 4A, 4B, and 4C illustrate the DC transmission line current, thyristor current and converter voltage wave forms, respectively, for the interruption apparatus of FIG. 3.

Shown in FIGS. 4A, 4B, and 4C are typical voltage and current curves for the converter circuit shown in FIG. 3. At point P, as indicated on the graphs, the initiation of interruption of the DC transmission line is begun. Prior in time to point P the converter is operating in a freewheeling mode, i.e., passing DC current therethrough without commutation. During the inversion mode, the inversion voltage across the converter (at points X and Y in FIG. 3) as indicated in the bottom graph begins to rise. Similarly, the current in the transmission line and in the thyristors begin to decrease as shown in the top and middle graphs, respectively. When the DC transmission line current has reached the desired low value, here zero, the DC breaker may be opened resulting in the voltage across the converter returning to zero as shown at point Q on the graph. Preferably, the breaker is opened when the transmission line current has reached an essentially zero value. However, opening the DC breaker as the transmission line current approaches this zero value will result in substantially less electrical arcing in the breaker than would occur if the breaker were opened when full DC line current was being transmitted. Also the breaker arc voltage will be much reduced.

Figure 5A:
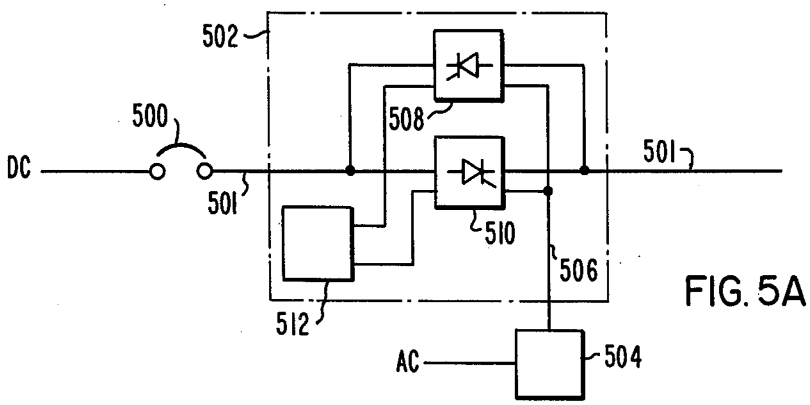
FIGS. 5A, 5B and 5C illustrate alternate embodiments for bidirectional DC current interruption devices.
Figure 5B:
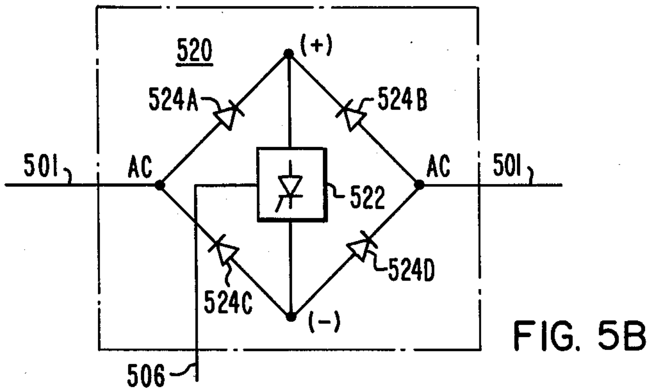
Figure 5C:
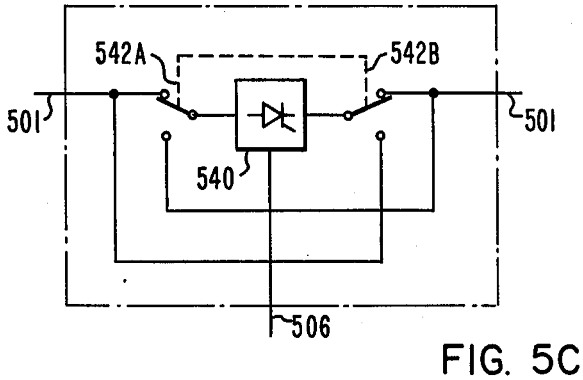

The converter circuits shown in FIGS. 2 and 3 are basically unidirectional current devices. The thyristors which are incorporated in these circuits are basically forward-biased devices, i.e., the current flows through the device from the anode to the cathode. Thus, for the circuits shown in FIGS. 2 and 3, the current is flowing from the left to the right in the transmission line. Accordingly, the potential of the line at the left is higher than at the right. In order to utilize the invention in DC transmission lines where bidirectional flow of current is possible, the converter arrangements shown in FIGS. 5A, 5B and 5C can be employed. In FIG. 5A a DC breaker 500 is shown in series-connection with the converter circuit 502 which is shown within the dashed lines in a DC transmission line 501. The AC output of the converter 502 is connected to the AC power sink 504 via a conductor 506. The circuit shown within the dashed lines of FIG. 5A may be replaced with the circuit shown in either FIG. 5B or 5C. The converter circuit of FIG. 5A is a back-to-back parallel arrangement of the converter circuits previously shown in either FIG. 2 or 3, and is indicated by the thryistor symbol within each converter block 508, 510. The converter controls 512 are modified so that when DC current is flowing from the left to the right as shown in the drawing, the lower converter 510 will be operated to withdraw DC power from the transmission line. Similarly, when current is flowing from right to left as shown in the drawing, the upper converter 508 will be operated. In FIG. 5B a full wave rectifier bridge circuit 520 is used to maintain the converter 522 in a forward-biased condition during the transmission of DC current flow in the transmission line. The circuit which is depicted is a well-known rectifying circuit for rectifying AC voltage into DC voltage. Here, the two terminals labelled "AC" normally associated with the AC input to the bridge rectifier 520 are connected to the DC transmission line 501 with the positive and negative DC output terminals of the bridge rectifier 520 being connected to the converter 522 so that the converter 522 will be in a forward-biased condition as indicated by the thyristor symbol in the converter 522. When current is flowing from the left to the right, rectifiers 524A and 524D conduct allowing establishing the proper current flow through the converter 522. Similarly, when current is flowing from right to left, rectifiers 524B and 524C establish the conduction path of current through the circuit. Because the direction of current flow through the converter 522 is maintained in a single direction, modification of the converter control not shown is not necessary. In FIG. 5C, unidirectional current flow through the converter 540 is obtained through the use of two switches 542A, 542B which are preferably ganged together for simultaneous operation as indicated by the dashed line. With this circuit the switches are set so that the converter 540 will be properly biased when DC current flow is established in the transmission line 501.

The above embodiments, illustrative of our invention, demonstrate the advantages thereof including the opening of a DC circuit breaker without substantial arcing, and the decrease in time required to open the DC circuit breaker over conventional interruption schemes. Other advantages are readily apparent to those skilled in the art. Additionally, these embodiments are exemplary only and should not be interpreted in a limiting sense.

We claim:

1. An electrical current interruption apparatus for a DC power line, comprising:

switch means disposed in the DC power line for being opened to space one portion of the DC power line from another portion thereof;

converter means connected in the DC power line for converting a portion of DC current flowing in the DC power line into AC current upon command, the converter means having an AC terminal through which the AC current flows;

control means interconnected with the converter means for supplying the command to the converter means; and AC power sink means interconnected with the AC terminal of the converter means for absorbing the AC current, the switch means, the converter means, the control means and the AC power sink means cooperating such that upon the command a portion of the DC current is converted to AC current and conducted through the AC terminal into the AC power sink means thereby reducing the DC current in the DC power line to a value which permits opening of the switch means without substantial arcing.

2. The apparatus as described in claim 1 wherein the converter means further comprises:

a plurality of legs electrically connected in parallel, each leg having an even number of thyristors with each thyristor having an anode, a cathode and a gate, the thyristors in each leg electrically connected in series such that the anode of one thyristor is connected to the cathode of the next thyristor in the leg with the anode of the first thyristor in each leg electrically connected together to form an anode common and the cathode of the last thyristor in each leg being electrically connected together to form a cathode common, the anode common and the cathode common being a DC input connection and a DC output connection, respectively, the midpoint of each leg being in electrical connection with the transformer means and the gate of each thyristor being in electrical connection with the control means.

3. The apparatus as described in claim 2 further comprising:

bypass switch means electrically connected in parallel with the converter means for bypassing the DC current around the converter means when closed and allowing DC current to flow into the thyristor converter means when open.

4. The apparatus as described in claim 2 wherein the AC power sink means further comprises:

an AC power line having three electrical phases;

a transformer having delta-interconnected primary windings, each corner of the delta-connected primary windings being electrically connected to each phase of the AC power line in a one-to-one relationship, each free end of the wye-connected secondary windings being electrically connected to each leg at the midpoint thereof in a one-to-one relationship;

a synchronous machine electrically connected to the AC power line and having a rotatable output shaft; and a flywheel mechanically coupled to the output shaft, the flywheel and synchronous machine in combination acting to absorb the electrical current transferred from the DC power line into the AC power line via the transformer means, the synchronous machine converting the electrical power into mechanical power rotating the output shaft thereof to drive the flywheel.

5. The apparatus as described in claim 2 wherein the control means further comprises:

means for multiplexing the DC current among the legs of the converter means, the multiplexing means being in electrical connection with the gates of the thyristors such that the thyristors in the conducting legs are turned on via their gates allowing the DC current to pass therethrough thereby distributing heat buildup among all the legs on a time-sharing basis while maintaining conduction of DC current through the thyristor converter means.

6. An electrical current interruption apparatus for a DC power line, comprising:

switch means in electrical connection with the DC power line for being opened to space one portion of the DC power line from another portion thereof;

converter means for changing DC current into AC current and being electrically connected in series with the switch means such that the opening thereof will deenergize the converter means, the converter means having a DC input connection, a DC output connection, and an AC output connection, the DC input and output connections being electrically connected to the DC power line such that the DC input connection is at a potential which is positive with respect to the DC output connection when DC current is passing therethrough;

control means in electrical connection with the converter means for operating the converter means upon command, in a freewheeling mode or an inversion mode; and transformer means intermediate the AC output of the thyristor converter means AC output and an AC power line and electrically connected therebetween for electrically interconnecting the DC power line with the AC power line, the disconnect means, converter means, the control means and the transformer means, in combination, cooperating such that in the inversion mode a portion of the DC current is taken out of the DC power line and converted into AC current via the converter means and enters the AC power line through the transformer means thereby reducing the DC current in the DC power line to a value allowing the switch means to open without substantial arcing, while in the freewheeling mode substantially all the DC current is conducted through the thyristor converter means and passes into the DC power line via the DC output connection thereof.

7. The apparatus as described in claim 6 wherein the converter means further comprises:

a plurality of legs electrically connected in parallel, each leg having an even number of thyristors with each thyristor having an anode, a cathode and a gate, the thyristors in each leg electrically connected in series such that the anode of one thyristor is connected to the cathode of the next thyristor in the leg with the anode of the first thyristor in each leg electrically connected together to form an anode common and the cathode of the last thyristor in each leg being electrically connected together to form a cathode common, the anode common and the cathode common being the DC input and DC output connections, respectively, the midpoint of each leg being in electrical connection with the transformer means and the gate of each thyristor being in electrical connection with the control means.

8. The apparatus as described in claim 7 wherein the converter means has 3 legs and the AC power line has 3 phases.

9. The apparatus as described in claim 8 wherein the transformer means further comprises:

a transformer having delta-interconnected primary windings, each corner of the delta-connected primary windings being electrically connected to a phase of the AC power line in a one-to-one relationship and each free-end of the wye-connected secondary windings being electrically connected to a leg of the converter means at the midpoint thereof in a one-to-one relationship.

10. The apparatus as described in claim 7 wherein the control means further comprises:

means for multiplexing the DC current among the legs of the converter means, the multiplexing means being in electrical connection with the gates of the thyristors such that the thyristors in the conducting legs are turned on via their gates allowing the DC current to pass therethrough thereby distributing heat buildup among all the legs on a time-sharing basis while maintaining conduction of DC current through the thyristor converter means.

11. The apparatus as described in claim 7 further comprising:

bypass switch means electrically connected in parallel with the converter means for bypassing the DC current around the converter means when closed and allowing DC current to flow into the thyristor converter means when open.

12. The apparatus as described in claim 7 further comprising:

second converter means electrically connected in parallel with the converter means with the anode common thereof being electrically connected to the cathode common of the converter means and the cathode common thereof being electrically connected to the anode common of the converter means, the midpoint of each leg of the second converter means being in electrical connection with the transformer means and the gate of each thyristor in the second converter means being in electrical connection with the control means, the second converter means being used to convert a portion of the DC current in the DC power line to AC current upon command when the DC current in the DC power line is flowing therein in a direction such that the anode common of the second converter means is at a potential which is positive with respect to the cathode common thereof.

13. The apparatus as described in claim 7 further comprising:

a full-wave rectifier bridge means having a positive DC terminal, a negative DC terminal and at least two AC terminals for controlling the direction of DC current flow into the converter means, each AC terminal being in electrical connection with the DC power line with the anode common of the converter means being in electrical connection with the positive DC terminal and the cathode common being in electrical connection with the negative DC terminal thereby allowing the converter means while in the inversion mode to convert DC current to AC current when DC current is flowing in either direction in the DC power line.

14. The apparatus as described in claim 7 further comprising:

first reversing means in series electrical connection with the DC input connection of the converter means and the DC power line and intermediate the converter means and the DC power line;

second reversing means in series electrical connection with the DC output connection of the converter and the DC power line and intermediate the converter means and the DC power line, the first reversing means and second reversing means being operated to reverse electrical orientation of the converter in the DC power line prior to the transmission of current therethrough thereby maintaining the positive potential of the DC input connection with respect to the DC output connection when current is transmitted in either one direction or the other in the DC power line.

* * * * *